US010162564B2

(12) United States Patent
Iwasaki et al.

(10) Patent No.: US 10,162,564 B2
(45) Date of Patent: *Dec. 25, 2018

(54) SELECTING A VIRTUAL TAPE SERVER IN A STORAGE SYSTEM TO PROVIDE DATA COPY WHILE MINIMIZING SYSTEM JOB LOAD

(71) Applicant: INTERNATIONAL BUSINESS MACHINES CORPORATION, Armonk, NY (US)

(72) Inventors: Norie Iwasaki, Yamato (JP); Katsuyoshi Katori, Yamato (JP); Takeshi Nohta, Yamato (JP); Kohei Taguchi, Yamato (JP); Eiji Tosaka, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,152

(22) Filed: Nov. 10, 2017

(65) Prior Publication Data

US 2018/0088819 A1    Mar. 29, 2018

Related U.S. Application Data

(63) Continuation of application No. 13/500,842, filed as application No. PCT/JP2010/061231 on Jul. 1, 2010, now Pat. No. 9,886,211.

(30) Foreign Application Priority Data

Oct. 7, 2009   (JP) ................. 2009-233006

(51) Int. Cl.
*G06F 12/00* (2006.01)
*G06F 3/06* (2006.01)
(Continued)

(52) U.S. Cl.
CPC .............. *G06F 3/065* (2013.01); *G06F 3/061* (2013.01); *G06F 3/0614* (2013.01);
(Continued)

(58) Field of Classification Search
CPC ......... G06F 11/1662; G06F 2206/1012; G06F 3/061; G06F 3/0614; G06F 3/065; G06F 3/0683; G06F 3/0686
(Continued)

(56) References Cited

U.S. PATENT DOCUMENTS 5,239,649 A    8/1993  McBride et al.
6,880,052 B2   4/2005  Lubbers et al.
(Continued)

FOREIGN PATENT DOCUMENTS

CN    1694057 A      11/2005
JP    2003067248 A    3/2003
(Continued)

OTHER PUBLICATIONS

Daisuke et al., "Replication Strategies to Enable Storage Load Balancing in P2P Networks," IEIC Technical Report, 103/692, Japan, 2004 (1 page).
(Continued)

*Primary Examiner* — Mardochee Chery
(74) *Attorney, Agent, or Firm* — Griffiths & Seaton PLLC

(57) ABSTRACT

In a storage system including plural source storage devices, a target storage device selects which source storage device to accept a copy request from the target storage device so as to minimize the load on the entire system. The system calculates first and second load values for job loads being processed. System load values for the system are derived from job load value of a specific data, and respective load values for first and second source storage devices. The system compares the system load values to select a storage
(Continued)

device to provide the data copy so as to minimize the load on the entire system.

13 Claims, 6 Drawing Sheets

(51) Int. Cl.
    *G06F 11/16* (2006.01)
    *G06F 11/20* (2006.01)
(52) U.S. Cl.
    CPC .......... *G06F 3/0659* (2013.01); *G06F 3/0683* (2013.01); *G06F 3/0686* (2013.01); *G06F 11/1662* (2013.01); *G06F 11/2097* (2013.01); *G06F 2206/1012* (2013.01)
(58) Field of Classification Search
    USPC .......................................... 711/113; 718/102
    See application file for complete search history.

(56) References Cited

U.S. PATENT DOCUMENTS

| | | |
|---|---|---|
| 6,925,541 B2 | 8/2005 | Yamagami |
| 7,469,274 B1 | 12/2008 | Ryu et al. |
| 7,606,844 B2 | 10/2009 | Kottomtharayil |
| 8,091,087 B2 | 1/2012 | Ali et al. |
| 2003/0004980 A1 | 1/2003 | Kishi et al. |
| 2004/0230742 A1 | 11/2004 | Ikeuchi et al. |
| 2005/0251547 A1 | 11/2005 | Bello et al. |
| 2007/0245081 A1 | 10/2007 | Ogawa |
| 2008/0082777 A1 | 4/2008 | Sakaguchi et al. |
| 2008/0244174 A1 | 10/2008 | Abouelwafa et al. |
| 2008/0263274 A1 | 10/2008 | Kishi et al. |
| 2008/0263551 A1 | 10/2008 | Ali et al. |
| 2008/0281830 A1 | 11/2008 | Sicola |
| 2009/0144422 A1 | 6/2009 | Chatley et al. |

FOREIGN PATENT DOCUMENTS

| | | |
|---|---|---|
| JP | 2004295860 A | 10/2004 |
| JP | 2005092874 A | 4/2005 |
| JP | 2005322230 A | 11/2005 |
| JP | 2008084253 A | 4/2008 |

OTHER PUBLICATIONS

"Load Balancing Options," Hitachi Storage (2 pages).
Bilicki, "LanStore: A Highly Distributed Reliable File Storage System," .NET technologies '2005 conference proceedings, Hungary, 2005 (10 pages).
Kunszt et al., "File-based Replica Management," Future Generation Computer Systems, 21, 2005 (9 pages).
Tierney et al., "A Network-Aware Distributed Storage Cache for Data Intensive Environments," IEEE, Aug. 1999 (9 pages).
ISA Search Report 20100803_ISA210.
ISA Search Report 20100803_ISA220.
ISA Search Report 20100803_ISA237.
Haeusser et al., "IBM Virtualization Engine TS7700 Release 1.4a: Tape Virtualization for System z Servers," http:/www.redbooks.ibm.com/redbooks/pdfs/sg247312.pdf , Feb. 1, 2009 (116 pages).
European Search Report.

(a)

| SOURCE VTS# | NUMBER OF PROCESSED DATA Ci | PRIORITY Pi | JOB LOAD VALUE Wi | FINAL LOAD VALUE Wi' | TOTAL SYSTEM LOAD VALUE Wtot |
|---|---|---|---|---|---|
| VTS0 | 2 | H,H | $\frac{1\times 0.8}{RA2} + \frac{1\times 0.8}{RA2}$ W0=3.2 | $\frac{1\times 0.9}{RA3} + \frac{1\times 0.9}{RA3}$ W0'=7.2 | W0' + W1' (7.2) (0.8) 8.0 |
| VTS1 | 1 | H | $\frac{1\times 0.8}{RA1}$ W1=0.8 | $\frac{1\times 0.8}{RA2} + \frac{1\times 0.8}{RA3}$ W1'=3.2 | W0' + W1' (3.2) (3.2) 6.4 |

(b)

| SOURCE VTS# | NUMBER OF PROCESSED DATA Ci | PRIORITY Pi | JOB LOAD VALUE Wi | FINAL LOAD VALUE Wi' | TOTAL SYSTEM LOAD VALUE Wtot |
|---|---|---|---|---|---|
| VTS0 | 2 | L,L | $\frac{1\times 0.2}{RA2} + \frac{1\times 0.2}{RA2}$ W0=0.8 | $\frac{1\times 0.2}{RA3} + \frac{1\times 0.2}{RA3}$ W0'=3.6 | W0' + W1' (3.6) (0.8) 4.4 |
| VTS1 | 1 | H | $\frac{1\times 0.8}{RA1}$ W1=0.8 | $\frac{1\times 0.8}{RA2} + \frac{1\times 0.8}{RA3}$ W1'=3.2 | W0' + W1' (0.8) (3.2) 4.0 |

FIG. 5

(a) PRIORITY WEIGHTING H=0.9, L=0.1

| SOURCE VTS# | NUMBER OF PROCESSED DATA $C_i$ | PRIORITY $P_i$ | JOB LOAD VALUE $W_i$ | FINAL LOAD VALUE $W$ | TOTAL SYSTEM LOAD VALUE $W_{tot}$ |
|---|---|---|---|---|---|
| VTS0 | 3 | L | $\frac{1 \times 0.1}{RA/3} + \frac{1 \times 0.1}{RA/3}$ $W_0=0.9$ | $\frac{1 \times 0.1}{RA/4} + \frac{1 \times 0.1}{RA/3} + \frac{1 \times 0.9}{RA/4}$ $W_0=4.8$ | $W_0 + W_1$ (4.8) (3.6) $W_{tot}=8.4$ |
| VTS1 | 2 | H | $\frac{1 \times 0.9}{RA/2}$ $W_1=3.6$ | $\frac{1 \times 0.9}{RA/3} + \frac{1 \times 0.9}{RA/3}$ $W_1=8.1$ | $W_0 + W_1$ (0.9) (8.1) $W_{tot}=9.0$ |

- SELECTION OF SOURCE VTS0 MAKES TOTAL SYSTEM LOAD SMALLER
- LARGER NUMBER OF PROCESSED DATA DOES NOT ALWAYS MAKE TOTAL SYSTEM LOAD SMALLER (b) PRIORITY WEIGHTING H=0.6, L=0.4 ; WHEN EACH DATA PROCESSING IS CLOSE TO EQUALITY (H-L=0.5)

| SOURCE VTS# | NUMBER OF PROCESSED DATA $C_i$ | PRIORITY $P_i$ | JOB LOAD VALUE $W_i$ | FINAL LOAD VALUE $W$ | TOTAL SYSTEM LOAD VALUE $W_{tot}$ |
|---|---|---|---|---|---|
| VTS0 | 3 | L | $\frac{1 \times 0.4}{RA/3} + \frac{1 \times 0.4}{RA/3}$ $W_0=3.6$ | $\frac{1 \times 0.4}{RA/4} + \frac{1 \times 0.4}{RA/3} + \frac{1 \times 0.6}{RA/4}$ $W=7.2$ | $W_0 + W_1$ (7.2) (2.4) $W_{tot}=9.6$ |
| VTS1 | 2 | H | $\frac{1 \times 0.6}{RA/2}$ $W_1=2.4$ | $\frac{1 \times 0.6}{RA/3} + \frac{1 \times 0.6}{RA/3}$ $W_1=5.4$ | $W_0 + W_1$ (3.6) (5.4) $W_{tot}=9.0$ |

- SELECTION OF SOURCE VTS1 MAKES TOTAL SYSTEM LOAD SMALLER
- SELECT SOURCE VTS1 FROM NUMBER OF PROCESSED DATA WHEN PRIORITY IS NOT CONSIDERED

FIG. 6

SELECTING A VIRTUAL TAPE SERVER IN A STORAGE SYSTEM TO PROVIDE DATA COPY WHILE MINIMIZING SYSTEM JOB LOAD

CROSS REFERENCE TO RELATED APPLICATIONS

This Application is a Continuation of U.S. patent application Ser. No. 13/500,842, filed on Apr. 6, 2012, which is a national stage entry of PCT/JP2010/061231, filed on Jul. 1, 2010, which claims priority to Japanese Patent Application 2009-233006, filed on Oct. 7, 2009.

BACKGROUND

The invention relates to a system and computer program product for requesting a copy of data from one virtual tape server (VTS) to another VTS in a storage system including multiple VTSs.

FIG. 1 shows a storage system (storage domain) in which two or more VTSs are IP-connected. The space of this storage system is called "grid domain." Each VTS is positioned as a cluster (Distributed Cluster) as a distributed storage element in the domain.

The domain is required to have a basic function such as doubling or tripling of data to meet requirements for data recovery in disasters. In order to ensure data integrity, it is necessary for each cluster in the domain to have the same data redundantly. The data redundancy enables data copies (data replication) between clusters connected through an IP network, i.e., between virtual tape servers. Specifically, data duplication or the like means replication of a collection of logical blocks, such as virtual logical volumes, through the IP network.

In a virtual tape server, a direct access storage device (DASD) is used to emulate tape drives and tape cartridges. The DASD consists of numerous interconnected hard disk drives. A host system performing I/O operations with respect to tapes in fact performs I/O operations with respect to a set of hard disk drives that emulate tape storage. The virtual tape server connects the DASD with a tape library provided with numerous tape cartridges and tape drives.

The host makes a request to access a tape volume. The virtual tape server intercepts the tape request and accesses the volume in the DASD. If the volume is not in the DASD, the virtual tape server recalls the volume from the tape drive to the DASD. The virtual tape server can respond to host requests for volumes in tape cartridges from the DASD substantially faster than responding to requests for data from tape drives. Thus, the DASD functions as a tape volume cache for volumes in the tape cartridge library.

A virtual tape storage system (or a storage system) can combine two or more virtual tape servers. In a storage system environment, two or more virtual tape servers, each integrated with a separate tape library, can access and store the same data volume. If an operation to recall a file from one virtual tape server fails, then the file can be recalled from another virtual tape server.

This redundant architecture provides data duplication improved to enable use of data and tape in the event a tape or VTS is damaged. Therefore, when the host system writes to a storage device, the data is saved on both virtual tape servers according to user settings.

Writing to both virtual tape servers simultaneously results in the waste of system resources. When the host closes a logical volume, a virtual tape controller connecting two virtual tape servers writes the logical volume to one of the virtual tape servers. This controller acts as an intelligent switch between the two virtual tape servers, and transparently connects the host computer with the virtual tape servers. Then, the logical volume is copied by the virtual tape controller from one virtual tape server to the other virtual tape server.

Copy processing between virtual tape servers can be performed in an immediate synchronization (Run) mode or a Deferred mode based on user preferences. For enterprises that operate on a cyclical basis, a host user will often set backup processing to be performed at a later time. For example, an enterprise may desire higher peak host I/O performance for primary job processing and not desire to have the backup process slow down their computers.

Japanese Patent Application Publication No. 2003-067248 provides an improved method to copy data from a virtual tape server to another virtual tape server in a conventional peer-to-peer environment. In this technique, every time when a data set is modified or created, a flag is used for indicating whether the data set necessitates to be copied from a memory device to another. If the only copy of the data exists on a physical tape in a tape library, backing up from a tape drive causes large delays in the overall processing. However, when multiple source virtual tape servers (VTSs) exist, these VTSs may be busy in processing jobs in progress. Further, the optimum copy source VTS may not be selected because the states of copy jobs being performed by the source VTSs are unconsidered in the entire system.

It is desirable to be able to select an optimum source VTS from among multiple VTSs when one target VTS requests a data copy in a storage system that includes multiple storage devices.

BRIEF SUMMARY

Exemplary embodiments of the invention relate to a system, method, and computer program product for requesting a copy of data from a virtual tape server (VTS) to another VTS in a storage system including multiple VTSs so as to minimize system job load.

One aspect of the invention concerns a storage system comprising a plurality of storage devices communicatively connected with each other, first source storage device and a second source storage device each processing data volumes in response to copy request jobs from other storage devices, and holding a job list of the data volumes being processed and attribute information thereof; and a target storage device requesting a copy of data from one of the first and second source storage devices, wherein said one of the first and second source storage devices is selected based on the attribute information so as to minimize system job load.

Another aspect of the invention concerns a computer-implemented method for having a target storage device select an optimal source storage device as a copy request destination of specific data in a storage system. The system including a plurality of storage devices communicatively connected with each other, m source storage devices each processing data volumes in response to copy request jobs from other storage devices, and holding a job list of the data volumes being processed and attribute information thereof, and a target storage device requesting the copy of data from one of the m source storage devices. The method comprises: (a) calculating load values representing job loads being processed by the m source storage devices based on the attribute information, respectively; (b) adding a job load value of the data respectively to the load value for each of the m source storage devices to obtain a final load value for said each of the m source storage devices, respectively; (c) adding to the final load value all the other load values to obtain a total system load value for the storage system; (d) executing step (c) for each of the m source storage devices to obtain the final total system load values for the m source storage devices, respectively; (e) comparing the obtained final total system load values; and (f) selecting said one of the m source storage devices based on the comparison to minimize the system job load.

A further aspect of the invention concerns a computer program product for having one target storage device select an optimal source storage device as a copy request destination of data in a storage system. The system includes a plurality of storage devices communicatively connected with each other, m source storage devices each processing data volumes in response to copy request jobs from other storage devices, and holding a job list of the data volumes being processed and attribute information thereof, and a target storage device requesting the copy of data from one of the m source storage devices. The computer program product operates to have the target storage device execute: (a) calculating load values representing job loads being processed by the m source storage devices based on the attribute information, respectively; (b) adding a job load value of the data respectively to the load value for each of the m source storage devices to obtain a final load value for said each of the m source storage devices, respectively; (c) adding to the final load value all the other load values to obtain a total system load value for the storage system; (d) executing step (c) for each of the m source storage devices to obtain the final total system load values for the m source storage devices, respectively; (e) comparing the obtained final total system load values; and (f) selecting said one of the m source storage devices based on the comparison to minimize the system job load.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

BRIEF DESCRIPTION OF THE SEVERAL VIEWS OF THE DRAWINGS

FIG. 5 illustrates an example of how to calculate a job load value for the entire storage system.

FIG. 6 illustrates another example of how to calculate a job load value for the entire storage system.

DETAILED DESCRIPTION

Figure 1:
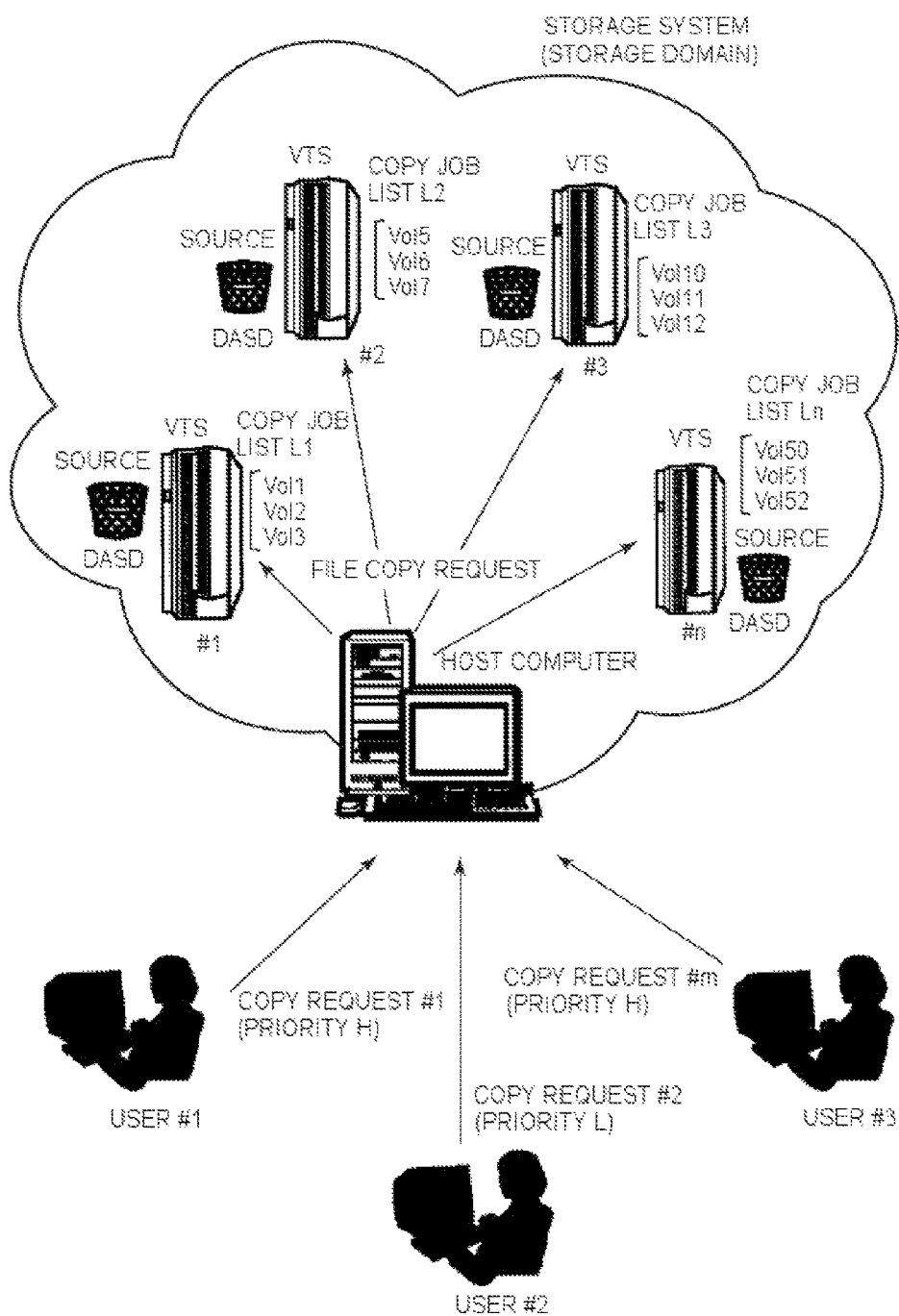
FIG. 1 illustrates a storage system (or a storage domain) configured such that multiple VTSs are IP-connected.

While the invention is illustrated and described in exemplary embodiments, the invention may be implemented in many different configurations, forms and materials. Embodiments of the invention, as depicted in the drawings and herein described in detail, are example embodiments of the invention and are not intended to limit the invention to the embodiments illustrated. Those skilled in the art will envision many other possible variations within the scope of the present invention. The description uses the following symbols: $2a$, $2b$, $2c$, . . . for hosts; $6a$, $6b$, $6c$, . . . for VTSs; $8a$, $8b$, $8c$, . . . for DASDs; and $10a$, $10b$, $10c$, . . . for tape libraries.

The invention relates to a method, system, and computer program product for a target virtual tape server (VTS) to select a source VTS from among two or more source VTSs so as to minimize the influence on the entire system load upon making a copy request in a storage system including multiple storage devices. The storage devices are interconnected, capable of communicating with one another, and configured to include a target storage device, and first and second source storage devices. The target storage device requests the source storage devices for a copy of specific data, and the source storage devices hold the specific data and are processing two or more data volumes in response to receipt of copy request jobs from other storage devices.

The first and second source storage devices in the storage system each hold a job list of the data volumes being processed and attribute information thereof, and the target storage device may:

reference the attribute information on the first and second source storage devices;

calculate first and second load values as job loads being processed by the first and second source storage devices based on the attribute information, respectively;

set values, respectively obtained by adding a job load value of the specific data to the first and second load values, as a first final load value for the first source storage device and a second final load value for the second source storage device, respectively;

add the second load value to the first final load value to give a first total system load value for the entire system;

add the first load value to the second final load value to give a second total system load value for the entire system;

compare the first total system load value with the second total system load value;

select, based on the comparison result, such a source storage device as to reduce the load on the entire system; and request the source storage device for the copy of the specific data.

The storage system may include attribute information that comprises a processing ability value (RA) for each job being processed by the source storage device, unprocessed data amounts ($C_i$=C1, C2, . . . , CN) and priorities ($P_i$=P1, P2, . . . , PN) associated with data volume numbers in the job list (the number of jobs is equal to N).

A source storage device in the storage system may process the two or more data volumes in parallel based on a processing ability value (RA/N) equally assigned to each of the processing ability values of the data volumes being processed.

The storage system may include first and second load values, and the load value of a specific data which are calculated based on the processing ability value, the unprocessed data amount for each data volume being processed by the source storage device, and the priority of each job. The first and second load values, and the load value of a specific data may be given as the sum of values each calculated by dividing the assigned processing ability value (RA/N) into a value resulting from multiplying the unprocessed data amount (Ci) for each data volume by each priority (Pi=high priority (H) or low priority (L)). The load value W of a specific data may be given as $W=\Sigma Ci \times Pi/(RA/N)$.

The storage system may include a priority value where a high priority value is larger than a low priority value. In one exemplary embodiment, the high priority value is 0.8 and the low priority value is 0.2. Further, the priority value may be based on attribute information set by a user in the data volume, and determined depending on either a Run mode or a Deferred mode at the time of the copy request.

A storage device in the storage system may include a DASD cache, be connected to a tape drive, and function as a high-speed cache of the tape drive.

In one embodiment, a storage system may include multiple storage devices that are interconnected, capable of communicating with one another, and configured such that the multiple storage devices include one target storage device and m source storage devices (where m is two or more). The target storage device requests the source storage devices for a copy of specific data, and the m source storage devices hold the specific data and are processing multiple data volumes in response to receipt of copy request jobs from other storage devices. In this storage system, the source storage devices each hold a job list of the data volumes being processed and attribute information thereof, and the target storage device may:

reference the attribute information on the m source storage devices, respectively;

calculate load values as job loads being processed by the m source storage devices based on the attribute information, respectively;

set values, respectively obtained by adding a job load value of the specific data to the load values for the m source storage devices, as final load values for the m source storage devices, respectively;

add, to one final load value for one source storage device, the load values for all the other (m−1) source storage devices to give a total system load value for the entire system;

execute step (d) on the final load values for the m source storage devices to give the final total system load values corresponding to the m source storage devices, respectively;

compare the m total system load values;

select, based on the comparison result, a source storage device from among the m source storage devices to reduce the load on the entire system; and requests the source storage device for the copy of the specific data.

In another embodiment, the present invention provides a method of causing one target storage device to select the optimum source storage device as a copy request destination of specific data in a storage system including multiple storage devices. The storage devices are interconnected, capable of communicating with one another, and configured such that the multiple storage devices include the one target storage device and m source storage devices (where m is two ore more). In this method, the m source storage devices hold the specific data, are processing multiple data volumes in response to receipt of copy request jobs from other storage devices, and each hold a job list of the data volumes being processed and attribute information thereof. This method may comprise:

referencing the attribute information on the m source storage devices, respectively;

calculating load values as job loads being processed by the m source storage devices based on the attribute information, respectively;

sets values, respectively obtained by adding a job load value of the specific data to the load values for the m source storage devices, as final load values for the m source storage devices, respectively;

adding, to one final load value for one source storage device, the load values for all the other (m−1) storage devices to give a total system load value for the entire system;

executing step (d) on the final load values for the m source storage devices to give the final total system load values corresponding to the m source storage devices, respectively;

comparing the m total system load values; and selecting, based on the comparison result, a source storage device from among the m source storage devices to reduce the load on the entire system.

Further, the invention provides a program for causing one target storage device to select the optimum source storage device as a copy request destination of specific data in a storage system including multiple storage devices interconnected to be able to communicate with one another and configured such that the multiple storage devices include the one target storage device and m source storage devices (where m is two ore more). In this program, the m source storage devices hold the specific data, are processing multiple data volumes in response to receipt of copy request jobs from other storage devices, and each hold a job list of the data volumes being processed and attribute information thereof. This program causes the target storage device to:

a) reference the attribute information on the m source storage devices, respectively;

b) calculate load values as job loads being processed by the m source storage devices based on the attribute information, respectively;

c) set values, respectively obtained by adding a job load value of the specific data to the load values for the m source storage devices, as final load values for the m source storage devices, respectively;

d) add, to one final load value for one source storage device, the load values for all the other (m−1) storage devices to give a total system load value for the entire system;

e) execute step (d) on the final load values for the m source storage devices to give the final total system load values corresponding to the m source storage devices, respectively;

f) compare the m total system load values; and g) select, based on the comparison result, a source storage device from among the m source storage devices to reduce the load on the entire system.

Further, the invention provides a method of causing a target storage device to select the optimum source storage device as a copy request destination of specific data in a storage system including multiple storage devices interconnected to be able to communicate with one another and configured such that the multiple storage devices include the target storage device and m source storage devices (where m is two ore more). In this method, the m source storage devices hold the specific data, are processing multiple data volumes in response to receipt of copy request jobs from other storage devices, and each hold a job list of the data volumes being processed and attribute information thereof.

This method is to select a source storage device that executes:
  a) referencing the attribute information on the m source storage devices, respectively;
  b) calculating load values as job loads being processed by N source storage devices based on the attribute information, respectively;
  c) setting values, respectively obtained by adding a job load value of the specific data to the load values for the m source storage devices, as final load values for the N source storage devices, respectively;
  d) adding, to the final load value for the source storage device, the load values for all the other storage devices to give a total system load value for the entire system;
  e) executing step (d) on the final load values for the m source storage devices to give the final total system load values for the M source storage devices, respectively;
  f) comparing the m total system load values; and
  g) selecting, based on the comparison result, a source storage device from among the N source storage devices to reduce the load on the entire system.

Figure 2:
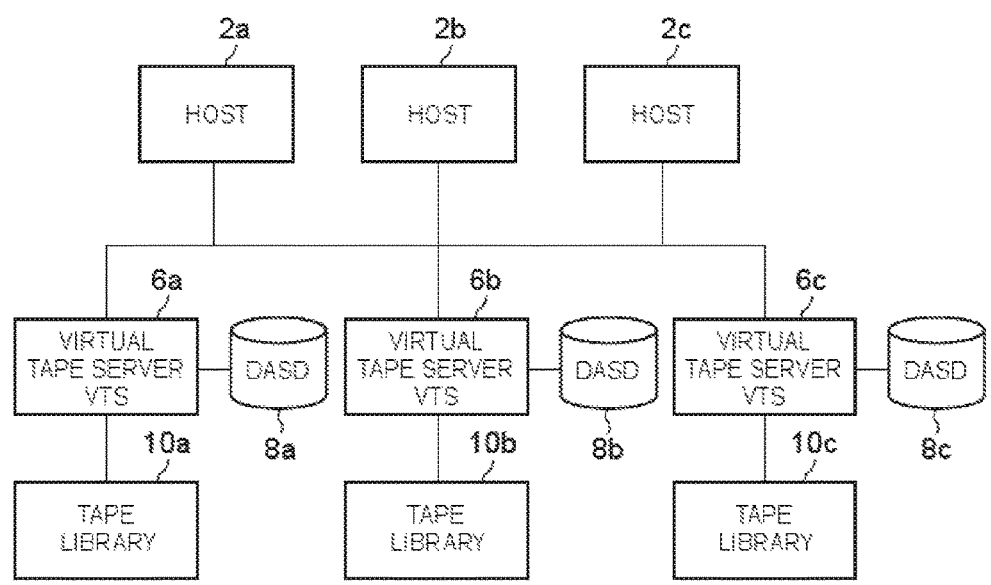
FIG. 2 illustrates a storage system environment including three storage devices using three virtual tape servers (VTSs).

A configuration of a storage system including three typical VTSs is now described as an example. FIG. 2 shows a storage system environment including three VTSs. Although additional virtual tape servers can be used depending on the operational system, a configuration of three individual VTSs is shown for illustrative purposes. Multiple host computers, referred to as "host" thereafter, 2a, 2b, and 2c are illustrated as an example.

In the storage system environment including three VTSs, the VTSs are transparent to the host computer 2a, 2b, and 2c. In other words, a host system acts as if the host computers 2a, 2b, and 2c wrote to a single tape server. As far as it functions as a single storage system, each VTS is transparent to the host. The hosts 2a, 2b, and 2c route I/O requests (Mount, Rewind Unload, etc.) to one of virtual tape servers 6a, 6b, and 6c.

[Each of DASDs 8a, 8b, and 8c includes numerous interconnected hard disk drives. Each of tape libraries 10a, 10b, and 10c includes numerous tape cartridges capable of being mechanically loaded into tape drives that the virtual tape servers 6a, 6b, and 6c can access.

The hosts can include an operating system, such as the IBM OS/390 operating system, or any other operating system known in the art. The virtual tape server 6a, 6b, or 6c can include a server system including software to emulate a tape library, such as an IBM virtual tape server. For example, the virtual tape servers 6a, 6b, and 6c may be implemented in separate computers including an IBM RS/6000 processor and the IBM AIX operating system. Each VTS can perform data movement operations among the hosts 2a, 2b, 2c, DASDs 8a, 8b, 8c, and tape libraries 10a, 10b, and 10c.

The hosts issue commands such as Mount, Rewind Unload, etc. to the VTSs. Mount requests preparation of a logical volume on a cache. Rewind Unload is to perform quasi-rewind of a physical tape with respect to a logical volume. The virtual tape servers 6a, 6b, and 6c control access to DASDs 8a, 8b and 8c and tape libraries 10a, 10b, and 10c, respectively. Each virtual tape server (e.g., IBM RS/6000 or the like) has its own system memory (DRAM) and HDD (hard disk drive). A copy queue for holding copy jobs exists in the system memory.

The hosts issue, to each VTS, a Rewind Unload request in which a logical volume is specified. In the logical volume, the way to copy data such as synchronization mode or asynchronous mode (deferred mode) is specified as a policy. This policy can be set by a user from each host. In the synchronization mode, immediate copy processing is performed on specified data the instant when Rewind Unload is received. After completion of the processing, a notification of completion (Command Completion) is returned to the request source. In the asynchronous mode, the notification of completion is returned immediately in receipt of Rewind Unload, but actual copy processing is performed after a constant time interval. In the copy processing, a specific volume is loaded into the copy queue of each VTS. If two or more volumes (data) are loaded into the copy queue and stay in a queued state, the data are processed in parallel.

In an actual operation of the storage system, the policy of each volume can be specified through a host. In the storage system, three VTSs exist and the host can connect to a specific VTS. Suppose that the host first writes necessary data to the specific VTS in units of logical volumes. In this case, the user sets, through the host, a policy indicating how to hold a copy of the written logical volume (data volume) in this system.

For example, the policy of each volume specifies to which of the multiple VTSs the volume should be copied and which of high priority (Run mode (H)) and low priority (Deferred mode (L)) is given as priority for the copy. The VTS makes a copy when receiving the Rewind Unload command after writing from the host to meet the policy set for each volume. The copy request is made to provide a redundancy of data in the system per logical volume. Even if one of the VTSs fails and is out of service, the same data can be acquired from another VTS because of the redundancy of the data.

Next, the best selection method for a source VTS that can minimize the decline in the performance of job processing in the entire system due to the copy processing will be described. As an algorithm of the present invention to select the best copy source, a value of job load ("load value" or "job load value") on a virtual tape server as a copy source is used to select the best copy source VTS.

The method of selecting a source VTS may be implemented as follows:
  1. The VTS (source VTS) unit, as a copy source in the system, releases attribute information including the number of jobs (data) existing in the copy queue and being processed (in progress), the amount of data in each job, its priority, etc.
  2. A target VTS acquires the attribute information on each source VTS to determine a job load expected from the attribute information on the source VTS. The job load is calculated by a predetermined calculation model (hereinafter referred to as "load calculation model") on the basis of the number of jobs in progress, i.e., in consideration of each priority given to the amount of each data.
  3. The target VTS selects an optimum source VTS to which the target VTS requests a copy of specific data. The loaded state of each source VTS is given as a job load value by the predetermined load calculation model. In one embodiment, there is provided a source VTS selection method in which the loaded state of the entire system is considered when the target VTS further requests a copy of specific data. The present invention is to select the optimum source VTS depending on to which VTS the job load value for data intended by the target VTS should be added in order to minimize the job load on the entire system. A method of causing a target VTS to select a source VTS in terms of this job load value for the entire system may be provided in the following example.

The target VTS determines the job load on each source VTS based on the amount of each volume (data) and its copy priority (H or L) in a list of copy jobs acquired from the source VTS and being processed. For example, the target VTS acquires attribute information including the list of copy jobs in the copy queue of each of the multiple source VTSs, the amount of unprocessed data for each job, and the priority thereof. The target VTS can get the attribute information on jobs in progress, which is held in and released by each source VTS. The target VTS calculates an expected load from the amount of remaining data for a job in progress in the copy queue of each source VTS at present and the priority thereof.

Two or more jobs in progress in the copy queue contained in each source VTS are processed in parallel, respectively. If ten jobs in progress are listed in the copy queue on condition that the processing ability of the source VTS is set to a fixed value RA, the processing ability RA/10 is assigned to each data. Each time the number of data to be processed is decremented, the processing ability (fixed value RA) can be spared for the remaining data being processed. Specifically, if the number of data being processed decreases from ten to eight, the processing ability per unprocessed data increases from RA/10 to RA/8.

The load value of a job being processed in a source VTS is an expected value at an evaluation point because any job is added into the queue of the source VTS at any time. Data in progress are processed in parallel regardless of their job priorities. Depending on the actual operation, a source VTS may be selected in consideration of the fact that many pieces of data being processed by the VTS are given high priority. Each source VTS holds attribute information on the job list in progress, and other VTSs can reference the information. Each source VTS holds the attribute information in a database recorded in a memory, an HDD (e.g., p series or RS/6000), or the like. The target VTS can reference and acquire the attribute information on other source VTSs to calculate a job load value for each source VTS.

Figure 3:
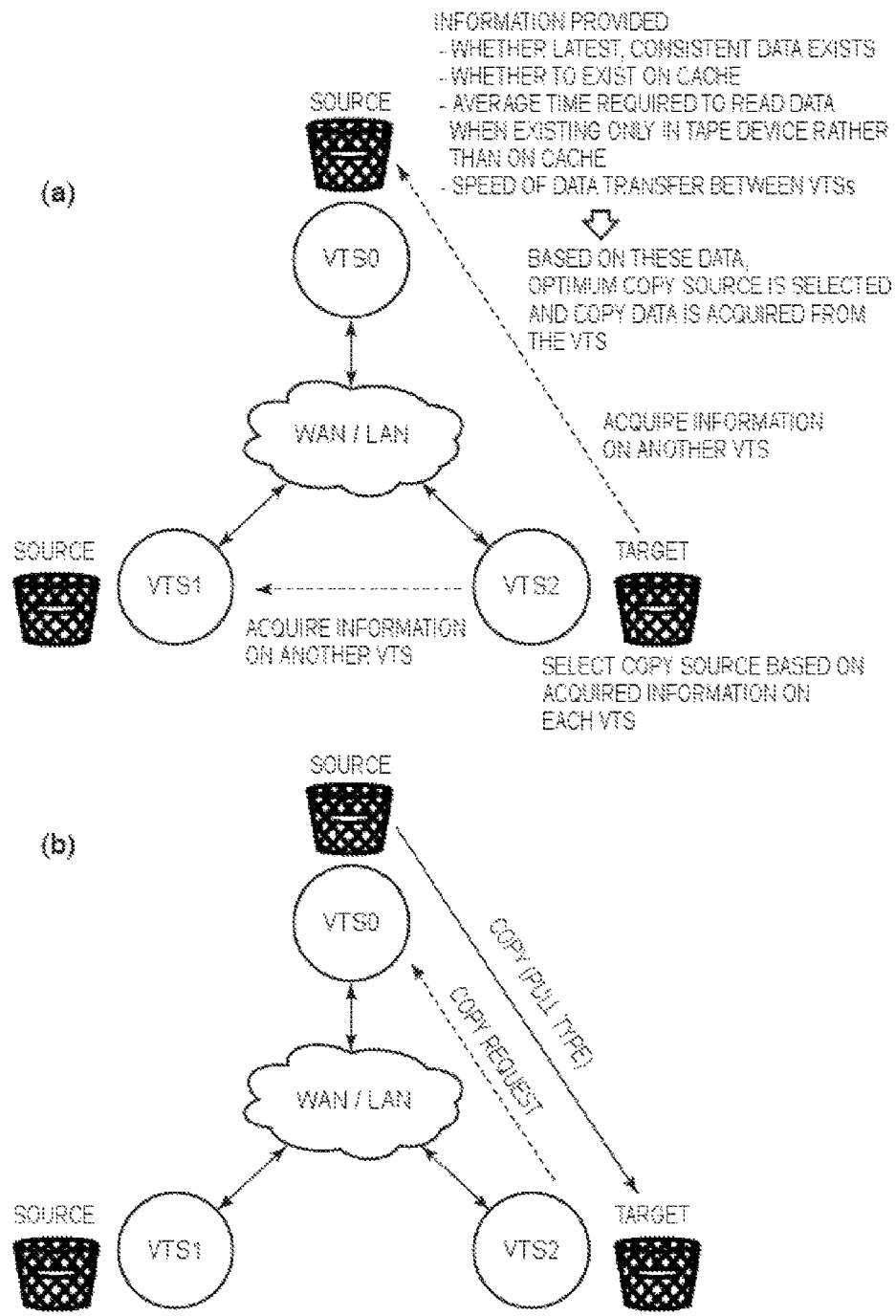
FIG. 3 illustrates examples of copy processing in a virtual tape storage system in which two source VTSs exist for one target VTS.

FIG. 3 shows typical examples of copy processing in a virtual tape storage system in which two source VTSs exist for a target VTS. In these examples, there is provided an algorithm to select one source VTS in the event data as a source exists in VT0/VTS1 and target VT2 makes a copy request for the data. The selection of the optimum VTS from the two source VTSs corresponds to a method of determining, using a source selection process in the VTS, from which of VTS0 and VTS1 the target VT2 can acquire the data optimally.

FIG. 3(a) illustrates a process for selecting and determining the optimum copy source, which determines which VTS has target data (volume). The process may include:

Determining whether to have data that meets the requirements for copy source data (i.e., the latest, consistent logical data in the system). Next, on the assumption that each VTS has the target data, the process selects the optimum copy source VTS based on the following conditions:

Determining whether the copy source exists on a disk cache (DASD) of the VTS and data does not need to be reread from a tape device.

In the case of one, or when data needs to be read from the tape device, determining an average time to read data.

Determining an average response time for data transfer between the file systems of VTS2 and each copy source (VTS0/VTS1), respectively.

FIG. 3(b) shows that VTS0, from which data can be acquired in the shortest time by a specified algorithm regardless of the fact that, like VTS0, source VTS1 also has data requested by VTS2, is selected as the source and copy processing is performed thereon. In this copy selection method, the states of copy jobs being processed are not considered in the copy source selection algorithm. This algorithm is to look for a source VTS having copy target data in consideration of only the time required to acquire the data. In the system including three or more VTSs, determining one source VTS to which a copy of specific data is requested does not always result in the optimum processing performance of the entire system.

Figure 4:
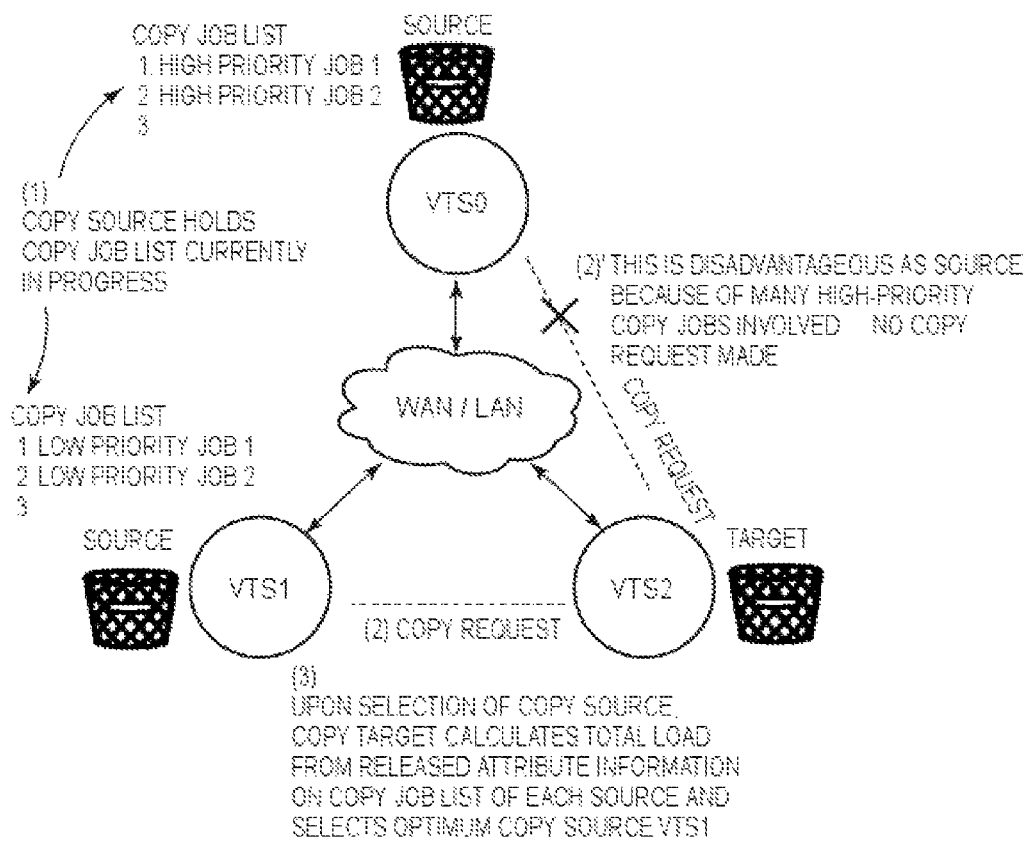
FIG. 4 illustrates how target VTS2 selects the best copy source of the present invention in consideration of job loads on source VTS0 and VTS1.

The present invention is to give an algorithm for selecting the optimum VTS from three or more VTSs in consideration of what influence is exerted on the entire system along with the selection of each individual VTS. FIG. 4 shows a method of selecting the best copy source from two source VTSs in consideration of job loads on these sources. The selection method for the optimum source VTS is typically processed in steps (1) to (2) or (2)' to (3).

Each of source VTS0 and VTS1 holds high- and low-priority jobs in the copy queue, respectively. The following describes each of source VTS selection steps (1), (2), (2)', and (3) in this case.

Step (1): The same number of processes or idle copy jobs (assuming that the total number of copies is the same) exist in VTS01 and VTS1 (copy source candidates). It is assumed that VTS0 processes many copy jobs with high priority and VTS1 processes many copy jobs with low priority.

Step (2): Target VTS2 acquires each job load value released from VTS0 and VTS1 (copy source candidates), respectively. In consideration of the job load value, VTS1 is selected as the optimum copy source by means of the copy source selection algorithm.

Step (2'): VTS1 is selected in the above step (2) as the copy source while avoiding the selection of VTS0 having many high-priority copy jobs as the copy source.

Step (3): The job load is distributed throughout the entire system so that high-priority copy jobs will be completed faster. In the storage system, each virtual tape server is processing multiple jobs (data volumes) based on copy requests from other VTSs. The selection method of the present invention is to calculate the job load value for the entire system (total system load value) when one VTS is selected as the source to enable faster completion of copying high-priority jobs while minimizing the influence on the performance of the entire system.

The following describes a calculation method for the total system load value to be calculated in step (3). It is assumed that the storage system includes two source VTSs (VTS0 and VTS1) for target VTS2. Suppose that target VTS2 makes a copy request to source VTS0 and VTS1. In this case, target VTS2 calculates a total system value Wtot for the entire system.

1. Load values for active jobs in source VTS0 and VTS1 being monitored by target VTS2 are expressed as W0 and W1. Each source VTS is processing multiple data volumes in progress, respectively.

2. Target VTS2 makes a copy request to active VTS0 or VTS1 for new data volume Vol#t. Final job load values (final load value) for source VTS0 and VTS1 are expressed as W0' and W1', respectively. W0' and W1' include some increments (e.g., $\alpha$ and $\beta$) to the job load values W0 and W1, respectively. The total system load value Wtot for the entire storage system is given as follows:

1. When job Vol#t is added to source VTS0, Total System Load Wtot=W0'+W1. Since W0'=W0+α, the final load value W0' for VTS0 becomes larger than W0.
2. When job Vol#t is added to source VTS1, Total System Load Wtot=W0+W1'. Since W1'=W1+β, final load value W1' for VTS1 becomes larger than W0.
3. From a comparison between cases of the total system load values for the entire system, a case where the load value is smaller is selected.

An object of the invention is to select a case with a smaller Wtot value from the above two cases (1) and (2). A process for causing target VTS2 to select the optimum source VTS from two source VTSs (VTS0 and VTS1) may be as follows:

When the total system load value Wtot in the case (1) is smaller than that in case (2), target VTS2 selects VTS0 as the source; and When the total system load value Wtot in the case (2) is smaller than that in case (1), target VTS2 selects VTS1 as the source.

The calculation of the total system load value in step (3) can also be applied easily to a case where the system includes more than two, e.g., m source VTSs (VTS1 to VTSm where m≥2). In this case, it is assumed that the storage system includes target VTS#t and m source VTSs (VTS1, VTS2, . . ., VTSm−1, and VTSm). Job load values for active source VTS1 to VTSm are expressed as W1 to Wm, respectively. The target VTS makes copy requests to active VTS1 to VTSm for new data volume Vol#t (specific data). Final job load values (final load values) for source VTS1 to VTSm are expressed as W1', W2', . . . , Wm−1', and Wm', respectively. The total system load value Wtot for the entire storage system including m VTSs is given as follows:

When job Vol#t is added to source VTS1, Wtot=W1'+W2+ . . . +W(m−1)+Wm.

When job Vol#t is added to source VTS2, Wtot=W1+W2'+ . . . +W(m−1)+Wm.

When job Vol#t is added to source VTS(m−1), Wtot=W1+W2+ . . . +W(m−1)'+Wm.

When job Vol#t is added to source VTSm, Wtot=W1+W2+ . . . +W(m−1)+Wm'.

Target VTS#t compares these m total system load values Wtot. As a result of comparison, target VTS#t can select, as the copy request destination, a source VTS with the smallest Wtot, i.e., with the least influence on the entire system load.

In general, the job load value W for each VTS is determined from attribute information on job list held in the copy queue and being processed (in progress). The attribute information includes a value (RA: ability value) for job processing ability of each VTS, the number (N) of data volumes included in the job list, the amount of unprocessed data (C1, C2) per data volume, priority (high priority (H) or low priority (L)), and other associated parameters. The load value is given as a function of these parameters as W=W(H, L, C, RA).

The following gives an example as a model to calculate the load on each VTS. The target VTS references the job processing ability value (RA), the amount of remaining data ($C_i$=C1, C2, C3, . . . , CN) for jobs (where the number of jobs is N, and data volume Voli=Vol1, Vol2, vol3, . . . , VolN) existing in the copy queue, and copy priority ($P_i$=high priority (H) or low priority (L)) of each data periodically per VTS. In general, the target VTS is given the load value W of each source VTS as W=ΣCi×Pi/(RA/N). Each of H and L is a weighting to each priority and can be set as a policy by the user through the host. The processing ability is assigned equally to jobs being processed, and two or more pieces of data being processed are processed in parallel.

FIG. 5 shows an example of how to calculate a job load value for the entire storage system. This example shows a selection method for a source VTS when target VTS0 makes a copy request for a high-priority data volume. The target VTS selects one of two source VTSs so that higher priority one of these jobs will be completed faster throughout the entire storage system. A job load on each source VTS is calculated while considering the balance of job loads throughout the entire system so that average time to complete all copy jobs for two or more high-priority jobs will be shortest (H=0.8 and L=0.2).

A simple model to cause target VTS2 to calculate the load values for source VTS0 and VTS1 is shown. The numbers of data being processed on source VTS0 and VTS1 are two and one, respectively. For the sake of clarity, it is assumed that the data amount of each data (data being processed or additional data) is the same. It is also assumed that the values (processing ability value RA) for job processing ability of VTS0 and VTS1 are the same. Load values W0, W1, W0', and W1' are calculated on condition that the ability value RA=1. RA/N (N=1, 2, 3, . . . , N, where N is the number of jobs being processed) is used as an assigned load value in calculating each load value W. Then, the calculation is made on condition that the amount of data for each job is all "1" and RA also takes "1" as a fixed value.

In the case of FIG. 5(a), two data of VTS0 have priority (H, H) that is high and one data of VTS1 has priority (H). As mentioned above, the VTS load value W is given as W=ΣCi×Pi/(RA/N). The calculation is made by setting both the data volume Ci and the processing ability RA to "1" because it is enough as long as the total system load values Wtot (W0'+W1 and W0+W1') can be relatively compared.

In the case of (a), if target VTS2 selects VTS1 as the source of a copy request for specific data, the job load on the entire system can be reduced. The result of this selection is determined from the number of data being processed because all the data being processed on VTS0 and VTS1 are given the same high priority (H).

In the case of FIG. 5(b), two data of VTS0 have priority (L, L) that is low and one data of VTS1 has priority (H). Even in the case of (b), the selection of VTS1 (Wtot=4.0) rather than VTS0 (Wtot=4.4) shows the same result as the case (a) in which the total system load is made smaller. However, in the case (b), it is found that the total system load values for VTS0 and VTS1 are close values (4.4 and 4.0). This is because, though the number of data being processed by VTS0 is larger than that of VTS1, the data of VTS0 have low priority L and the data of VTS1 has high priority H.

FIG. 6 shows another example of how to calculate a job load value for the entire storage system. In FIG. 6, another simple model to cause target VTS2 to calculate the load values for source VTS0 and VTS1 is shown. Under the same conditions as the cases of FIG. 5, this example shows that, when the numbers of data being processed on source VTS0 and VTS1 are three (L, L, L) and two (H, H), respectively, target VTS2 changes source VTS to be selected depending on the setting of priority (H, L).

In the case of FIG. 6(a), if high priority H=0.9 and low priority L=0.1, it shows that the selection of VTS0 makes the total system load smaller and high priority jobs processed faster. As a result, since two high priority jobs are in progress on VTS1, target VTS2 selects VTS0, giving priority to the processing of high priority jobs on VTS1. On the other hand, in the case of (b), if H=0.6 and L=0.4, it shows a case where both data processing is close to equality (H=L=0.5). In this case, the selection of VTS1 with a smaller number of data being processed thereon can make the total system load lighter.

The processing performance of each VTS depends on the number of jobs being processed on condition that the processing ability is the same. In the storage system environment including multiple VTSs, each VTS holds numerous jobs in progress in response to multiple copy requests from other VTSs based on a specific task on the host. In general, the target VTS can select a VTS with a smaller number of processing jobs to perform backup processing for data duplication in order to reduce the total system load of the entire system. However, the storage system operator may want to optimize the total system load while processing high priority jobs preferentially. For such an operational requirement, the system operator and the user can deal with the operational requirement in such a manner that, upon setting a data volume policy, the user can specify the priority (H, L) of each logical volume and its weighting appropriately. In such a case, as shown in FIG. 6(a), the target VTS can select VTS0 to make the processing of high priority (H) jobs on VTS1 faster.

The above-mentioned examples of load value calculation are just illustrative and do not limit the selection method of the present invention. The components (clusters) of the system of the present invention are not limited to VTSs, and it may include general storage devices (CD, DVD, SSD), NASs (Network Attached Storage), and server devices. In an actual storage system, jobs (data) being processed have different data amounts, respectively. Even in the case of different data volumes, they are processed in the same manner as in the examples of FIG. 5 and FIG. 6 in terms of that a processing ability value (RA) is equally assigned to processing of each data. Further, this case is also the same as the above examples in terms of that the source VTSs perform, in parallel, copy processing for all jobs being processed.

As described above, according to the present invention, it is advantageous that, in a storage system including three or more storage devices, a target VTS can select such a source VTS as to minimize the influence on the entire system load from among two or more source VTSs upon making a copy request. In other words, the target VTS selects one of the two ore more source VTSs to enable the fastest completion of high priority jobs while minimizing the influence on the copy processing throughout the entire system.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "component" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A virtual tape server storage system comprising:
a plurality of storage devices communicatively connected with each other;
a plurality of source storage devices including at least a first source storage device and a second source storage device each processing data volumes in response to copy request jobs from other storage devices, and holding a job list of the data volumes being processed and attribute information thereof; and
a target storage device requesting a copy of data from one of the plurality of source storage devices, wherein said one of the plurality source storage devices is selected before commencement of processing the data volumes based on the attribute information so as to minimize system job load;
wherein the selection of said one of the first and second source storage devices comprises:
(a) calculating first and second load values representing job loads processed, respectively, by the first and second source storage devices;
(b) adding a job load value for said data respectively to the first and second load values to obtain a first final load value for the first source storage device and a second final load value for the second source storage device, respectively;
(c) adding the second load value to the first final load value to obtain a first total system load value for the storage system;
(d) adding the first load value to the second final load value to obtain a second total system load value for the storage system;
(e) comparing the first total system load value with the second total system load value; and
(f) selecting said one of the first and second source storage devices based on the comparison to minimize the system job load.

2. The storage system according to claim 1, wherein the attribute information includes a processing ability value (RA) for each job processed by the source storage devices, unprocessed data amounts (Ci=C1, C2, . . . , CN) and priorities (Pi=P1, P2, . . . , PN) associated with data volume numbers in the job list, where N is the number of jobs.

3. The storage system according to claim 2, wherein the first and second source storage devices process data volumes in parallel based on a processing ability value (RA/N) equally assigned to each of the processing ability values of the data volumes being processed.

4. The storage system according to claim 3, wherein the first load value, the second load value, and the load value of the data are calculated based on the processing ability value, the unprocessed data amount for each data volume being processed by the source storage devices, and the priority of each job.

5. The storage system according to claim 4, wherein the first load value, the second load value, and the load value of the data are given as a sum of values each calculated by dividing the assigned processing ability value (RA/N) into a value resulting from multiplying the unprocessed data amount (Ci) for each data volume by each priority (Pi=high priority (H) or low priority (L)).

6. The storage system according to claim 5, wherein the first load value, the second load value, and the load value W of the data are given as $W=\Sigma c_i \times P_i/(RA/N)$.

7. The storage system according to claim 6, wherein the priority value is such that a high priority value is larger than a low priority value.

8. The storage system according to claim 7, wherein the high priority value is approximately 0.8 and the low priority value is approximately 0.2.

9. The storage system according to claim 5, wherein the priority value is given by the attribute information set by a user in the data volume, and determined based on one of a Run mode and a Deferred mode at a time of the copy request.

10. The storage system according to claim 1, wherein the storage devices includes a DASD cache.

11. The storage system according to claim 10, wherein the DASD cache is coupled to a tape drive and functions as a high-speed cache of the tape drive.

12. A virtual tape server storage system comprising:
a plurality of storage devices communicatively connected with each other;

a plurality m source storage devices (where m>=2) each processing data volumes in response to copy request jobs from other storage devices, and holding a job list of the data volumes being processed and attribute information thereof; and a target storage device requesting a copy of data from one of the plurality m source storage devices, wherein said one of the plurality m source storage devices is selected before commencement of processing the data volumes based on the attribute information so as to minimize system job load;

wherein the selection of said one of the m source storage devices comprises:

(a) calculating load values representing job loads respectively processed by the m source storage devices based on the attribute information;

(b) adding a job load value of the data to the load value for each of the m source storage devices to obtain a final load value for each of the m source storage devices, respectively;

(c) adding, to one final load value for one of the source storage devices, all the other load values to obtain a total system load value for the storage system;

(d) executing step (c) on the final load values for each of the m source storage devices to obtain the final total system load values corresponding to the m source storage devices, respectively;

(e) comparing the m total system load values; and (f) selecting said one of the m source storage devices based on the comparison to minimize the system job load.

13. A computer program product for selecting an optimal source storage device as a copy request destination of data in a virtual tape server storage system including a plurality of storage devices communicatively connected with each other, a plurality m source storage devices each processing data volumes in response to copy request jobs from other storage devices, and holding a job list of the data volumes being processed and attribute information thereof, and a target storage device requesting the copy of data from one of the plurality m source storage devices, the computer program product comprising a non-transitory computer readable storage medium having computer readable program code embodied therewith and configured to:

(a) calculate load values representing job loads being processed by the plurality m source storage devices based on the attribute information, respectively;

(b) add a job load value of the data respectively to the load value for each of the plurality m source storage devices to obtain a final load value for said each of the plurality m source storage devices, respectively;

(c) add to the final load value all the other load values to obtain a total system load value for the storage system;

(d) execute step (c) for each of the m source storage devices to obtain the final total system load values for the plurality m source storage devices, respectively;

(e) compare the obtained final total system load values; and (f) before commencement of processing the data volumes, select said one of the plurality m source storage devices based on the comparison to minimize the system job load.

* * * * *